US012430750B2

United States Patent
Ge et al.

(10) Patent No.: US 12,430,750 B2
(45) Date of Patent: Sep. 30, 2025

(54) METHOD FOR DETECTING A SURFACE DEFECT OF A COPPER-CLAD LAMINATE BASED ON MULTI-SCALE GRIDDING

(71) Applicant: Hangzhou Baizijian Technology Co., Ltd, Zhejiang (CN)

(72) Inventors: Ming Ge, Hangzhou (CN); Jiang Wei, Hangzhou (CN); Jingxue Shen, Hangzhou (CN); Luye Ma, Hangzhou (CN)

(73) Assignee: Hangzhou Baizijian Technology Co., Ltd, Hangzhou (CN)

( * ) Notice: Subject to any disclaimer, the term of this patent is extended or adjusted under 35 U.S.C. 154(b) by 0 days.

(21) Appl. No.: 18/996,568

(22) PCT Filed: Jul. 5, 2024

(86) PCT No.: PCT/CN2024/103816
§ 371 (c)(1),
(2) Date: Jan. 17, 2025

(87) PCT Pub. No.: WO2025/007949
PCT Pub. Date: Jan. 9, 2025

(65) Prior Publication Data
US 2025/0259297 A1        Aug. 14, 2025

(30) Foreign Application Priority Data

Jul. 5, 2023   (CN) .......................... 202310817164.2

(51) Int. Cl.
*G06T 7/00*     (2017.01)
*G06T 3/02*     (2024.01)
(Continued)

(52) U.S. Cl.
CPC ................ *G06T 7/001* (2013.01); *G06T 3/02* (2024.01); *G06T 7/11* (2017.01); *G06T 7/194* (2017.01);
(Continued)

(58) Field of Classification Search
CPC ... G06T 7/001; G06T 3/02; G06T 7/11; G06T 7/194; G06T 2207/20081; G06T 2207/20221; G06T 2207/30141
See application file for complete search history.

(56) References Cited

U.S. PATENT DOCUMENTS

2011/0049104 A1*   3/2011   Kato ........................ C23F 1/18
                                                                  252/79.1
2014/0126818 A1    5/2014   Wei
(Continued)

FOREIGN PATENT DOCUMENTS

CN     102654902 A     9/2012
CN     109658381 A     4/2019
(Continued)

OTHER PUBLICATIONS

Hong Huilong; International Search Report for PCT App. No. PCT/CN2024/103816; Oct. 17, 2024; 4 pages; China National Intellectual Property Administration as the International Searching Authority; Beijing, CN.
(Continued)

*Primary Examiner* — Mia M Thomas
(74) *Attorney, Agent, or Firm* — William P. Jensen; Crain Caton & James P.C.

(57) ABSTRACT

Provided is a method for detecting a surface defect of a copper-clad laminate based on multi-scale gridding. The method includes: S1, collecting a photographed image of the copper-clad laminate through a line-scan camera; S2, segmenting out a copper-clad region and a non-copper-clad
(Continued)

region, and rotating the copper-clad region upright; S3, dividing the copper-clad region of the image of the copper-clad laminate, and performing a pyramid operation on a divided original grid image; S4, determining averages of pixel values at all levels; S5, fusing the average at all levels to obtain a final background average; and S6, searching for a final defect according to a difference between a background and a foreground.

6 Claims, 7 Drawing Sheets

(51) Int. Cl.
    *G06T 7/11*     (2017.01)
    *G06T 7/194*     (2017.01)

(52) U.S. Cl.
    CPC ............... *G06T 2207/20081* (2013.01); *G06T 2207/20221* (2013.01); *G06T 2207/30141* (2013.01)

(56) References Cited

U.S. PATENT DOCUMENTS

| | | | | |
|---|---|---|---|---|
| 2022/0399236 | A1* | 12/2022 | Braganca, Jr. | .......... H01L 24/75 |
| 2023/0140278 | A1* | 5/2023 | Leute | ................. G01B 11/2527 356/237.1 |
| 2024/0104830 | A1* | 3/2024 | Yin | .......................... G06T 15/04 |
| 2024/0354485 | A1* | 10/2024 | Best | ...................... G03F 7/7065 |

FOREIGN PATENT DOCUMENTS

| | | |
|---|---|---|
| CN | 111695482 | 9/2020 |
| CN | 111899225 A | 11/2020 |
| CN | 114092389 A | 2/2022 |
| CN | 114638784 A | 6/2022 |
| CN | 115861309 | 3/2023 |
| CN | 116152226 A | 5/2023 |
| CN | 116342542 | 6/2023 |
| CN | 116542974 | 8/2023 |
| JP | 2016217989 | 12/2016 |
| WO | 2021135302 | 7/2021 |
| WO | 2021135372 | 7/2021 |

OTHER PUBLICATIONS

He Huabing; First Office Action for CN App. No. 202310817164.2; Aug. 11, 2023; 8 pages; China National Intellectual Property Administration; Beijing, CN.

He Huabing; Notification to Grant Patent Right for Invention for CN App. No. 202310817164.2; Aug. 29, 2023; 3 pages; China National Intellectual Property Administration; Beijing, CN.

Ying Gao et al.; A Real-time Defect Detection Method for Digital Signal Processing of Industrial Inspection Applications; Journal of Latex Class Files, vol. 14, No. 8; Aug. 2015.

Ya-Rui Zheng et al.; Surface Defect Detection Algorithm Based on Dual Dynamic Head Sparse R-CNN; Instrument Technique and Sensor, No. 5; May 2023; China Academic Journal Electronic Publishing House; China.

* cited by examiner

METHOD FOR DETECTING A SURFACE DEFECT OF A COPPER-CLAD LAMINATE BASED ON MULTI-SCALE GRIDDING

This national stage application filed under 37 U.S.C. § 371 based on International Patent Application No. PCT/CN2024/103816, filed Jul. 5, 2024, which claims priority to Chinese Patent Application No. 202310817164.2 filed Jul. 5, 2023, the disclosures of which are incorporated herein by reference in their entirety.

TECHNICAL FIELD

The present application relates to a method for detecting a surface defect of a copper-clad laminate based on multi-scale gridding.

BACKGROUND

As a core material of a printed circuit board, a copper-clad laminate mainly plays roles of interconnection, conduction, insulation, and the like on the printed circuit board, significantly affecting signal transmission in a circuit. Circuit boards made of copper-clad laminates are widely used in the communication, medical, military, and semiconductor industries and the like, involving almost all electronic information products. Therefore, the quality of the copper-clad laminate as a source material directly affects the development of various industries.

A conventional quality inspection mode in a production line of the copper-clad laminate is to position defects by manually inspecting the surface of the material. Moreover, there are many types of defects, for example, scratches, dirt, black spots, white spots, and bubbles. However, the conventional quality inspection mode has the following disadvantages: 1. some sight defects may not be well perceived by naked human eyes due to the properties of the surface of the material; 2. the material is relatively large, a worker needs to rotate and turn over the material when searching for the defects, and the material is damaged by these operations again; 3. people have limited energy, so even if there are defects, they are not perceived; 4. excessive labor costs are caused; and 5. the production line has low operating efficiency due to each of the preceding disadvantages.

At present, there is also a related visual application to the quality inspection of the copper-clad laminate: through visual imaging, the averages of local regions of the copper-clad laminate in an image are calculated one by one as the background of the surface of the copper-clad laminate, and when there is a defect on the surface of the copper-clad laminate, the defect is detected due to a grayscale difference. In this manner, since the average calculation is affected by an entire region, the background obtained through the average calculation is almost filled with the grayscale of the defect when the defect accounts for a relatively large proportion of the entire local region, resulting in that the defect cannot be detected normally. In addition, since the averages are calculated by sliding the window pixel by pixel movements of a sliding window, this mode is excessively time-consuming when a relatively large object is detected.

SUMMARY

The present application provides a method for detecting a surface defect of a copper-clad laminate based on multi-scale gridding. For the surface defect of the copper-clad laminate, this method has a faster speed and higher robustness than previous visual detection for quality inspection of the copper-clad laminate, although sizes of different defects are different.

Therefore, the present application adopts the technical solutions described below. The method for detecting a surface defect of a copper-clad laminate based on multi-scale gridding includes the steps S1 to S6. In S1, a photographed image of the copper-clad laminate is collected through a line-scan camera. In S2, a copper-clad region and a non-copper-clad region are segmented out, and the copper-clad region is rotated upright. In S3, the copper-clad region of the image of the copper-clad laminate is divided according to set grid parameters, and a pyramid operation is performed on a divided original grid image, where the set grid parameters include: a width $\Delta x$ of the original grid image, a height $\Delta y$ of the original grid image, a number N of pyramid levels, a scaling coefficient S of a pyramid grid, and an average degradation coefficient V, and selection of the average degradation coefficient depends on the number N of pyramid levels. In S4, averages at all levels are determined. In S5, the average at all the levels are fused to obtain a final background average. In S6, a final defect is searched out according to a difference between a background and a foreground.

In an embodiment, step S2 includes the steps S2.1 to S2.3. In S2.1, each image of the copper-clad laminate is segmented into the copper-clad region and the non-copper-clad region through threshold solution, where the threshold solution is implemented through histogram-based background and foreground segmentation. In S2.2, after the background and foreground segmentation is completed, sizes of contours are compared to screen out the copper-clad region by the following formula: $c\_obj = \max(c\_obj, c_m)$, $m \in (0, n)$; where $c\_obj$ denotes an object contour, $c_m$ denotes a selected to-be-compared contour, m denotes a contour index, n denotes a total number of contours. In S2.3, after the object contour is extracted, an actual orientation state of the copper-clad region is determined through a minimum bounding rectangle algorithm, that is, it is determined that the object contour is an "upright" rectangle or a rectangle that is not "upright" and the position of the object contour in the image of the copper-clad laminate is determined, and after the angle of the object contour and the central position of the object contour are obtained, the image of the copper-clad laminate by establishing an affine transformation matrix is rotated and translated to rotate the copper-clad region to an "upright" position, where the copper-clad region is subsequently extracted from the image of the copper-clad laminate for subsequent visual defect detection. The word "upright" indicates that a Cartesian coordinate system is used as a coordinate reference frame, and the included angle between one side of the rectangle and the x-axis is 0 degrees.

In an embodiment, $\Delta x$ is used as the width of the original grid image and $\Delta y$ is used as the height of the original grid image such that the copper-clad region is divided into K original grid images, and the pyramid operation is performed on each of the K original grid images. The number N of pyramid levels is represented as a formula:

$$N = \begin{cases} N, & W >= 5 \ \&\& \ H >= 5; \\ 1, & \text{ELSE} \end{cases},$$

the number of pyramid levels is set according to the width of the pyramid grid image and the height of the pyramid grid image, in response to the width of the pyramid grid image or the height of the pyramid grid image exceeding 5, the number of pyramid levels is forcibly set to 1, and the pyramid operation is stopped, otherwise, the original grid image is scaled to N levels with the scaling coefficient S. The calculation of the average degradation coefficient V depends on the number N of pyramid levels, and the average degradation coefficient V is the reciprocal 1/N of the number N of pyramid levels.

In an embodiment, in step S4, a 4-point interpolation averaging algorithm is performed on each of K*N images by the following formulas:

$$f_1 = \frac{p_2^x - \Delta x * 0.5}{p_2^x - p_1^x} f(p_1) + \frac{\Delta x * 0.5 - p_1^x}{p_2^x - p_1^x} f(p_2);$$

$$f_2 = \frac{p_4^x - \Delta x * 0.5}{p_4^x - p_3^x} f(p_3) + \frac{\Delta x * 0.5 - p_3^x}{p_4^x - p_3^x} f(p_4); \text{ and}$$

$$f(p_5) = f_1 * \frac{p_4^y - \Delta y * 0.5}{p_4^y - p_3^y} + f_2 * \frac{\Delta y * 0.5 - p_3^y}{p_4^y - p_3^y}.$$

In the preceding formulas, $p_1$, $p_2$, $p_3$, and $p_4$ denote four vertices of the pyramid grid image. $f_i$ denotes pixel values of different vertices. $p_i^x$ and $p_i^y$ denote an x value and a y value of a vertex of the four vertices, respectively. i=1, 2, 3, and 4 in the preceding formulas. K denotes the number of original grid images. N denotes the number of pyramid levels. Through the preceding calculations, all the original grid images and all pyramid grid images each have a background value.

In an embodiment, in step S5, all background values are combined as a final background value of an original region, background values of pyramid grid images are selected, multiplied by the average degradation coefficient, and accumulated such that a final background value is obtained, and a formula is as follows:

$$avg = \sum_{i=0,1,\ldots N} a_i * V;$$

where avg denotes the final background value, $a_i$ denotes an average of pixel values of each level, V denotes the average degradation coefficient. An empty image that is the same size as the original grid image is created, the entire empty image is filled with the value avg to form a defect background image, the defect background image is differenced from the original grid image, a grayscale tolerance for black and white defects is set, and a defect is detected.

In an embodiment, in the present application, MobileNetV2, a model based on deep learning, is used as a transfer model. A network transfer structure of the transfer model includes an inverted residual structure, a pyramid structure, a hourglass module, and a classification module. The hourglass module is built based on three types of sub-modules, each of the sub-modules is built by connecting different network layers, and the three types of sub-module are listed as follows: a sub-module 1: a dimension expansion layer, a normalization layer, and a relu6 activation function layer; a sub-module 2: a depthwise separable layer, a normalization layer, and a relu6 activation function layer; and a sub-module 3: a dimension reduction layer, and a normalization layer. A residual structure is configured to perform element-wise addition on an input feature of the hourglass structure and an output feature of the hourglass structure to fuse the features. A classification layer refers to two fully connected layers at an end of a network to performs flattening according to a defect category.

In an embodiment, step S6 specifically includes the steps S6.1.1 to S6.3. In 6.1.1, an inputted image and one convolutional layer are connected in series to start feature extraction in the first layer. In 6.1.2, the three sub-modules are formed into the hourglass structure, and different numbers of hourglass structures are connected in series to form the inverted residual structure to acquire features of different dimensions and avoid the excessive number of parameters. In 6.1.3, a skip connection pyramid operation is performed at the end of the network so that feature information is abstracted and it is ensured that information loss does not occur due to excessive abstraction. In 6.2, defect sample data is collected and labeled with categories, and the pre-processed data is inputted to the network for training, where the network adjusts final output according to a set loss function. The loss function used is defined as follows:

$$\text{loss}(x, cls) = -\log\left(\frac{\exp^{x[cls]}}{\sum_{n=1}^{C} \exp^{x[n]}}\right);$$

where x[cls] denotes a predicted value, cls denotes a true label category, C denotes a number of categories, n denotes an index of a category, and a smaller loss indicates a greater probability in a corresponding bracket and a greater probability that a sample is in a true category. In 6.3, after the training is completed, a model is deployed in an actual running environment, where when a defect is detected normally, the defect is inputted into the network to be classified to achieve a final defect classification result.

When the defect is detected, data amount is typically relatively large because an acquired visual image is subject to precision requirements. With the solutions of the present application, a calculation amount is reduced and local information of the background is retained through the use of the preceding technical process mentioned above because the creation of the background no longer requires an average calculation of an entire grid or an average calculation performed in a sliding window manner. A detection speed is increased, and stable precision is ensured. A good detection effect is achieved when the material needs to be detected at a high speed.

DETAILED DESCRIPTION

Figure 1:
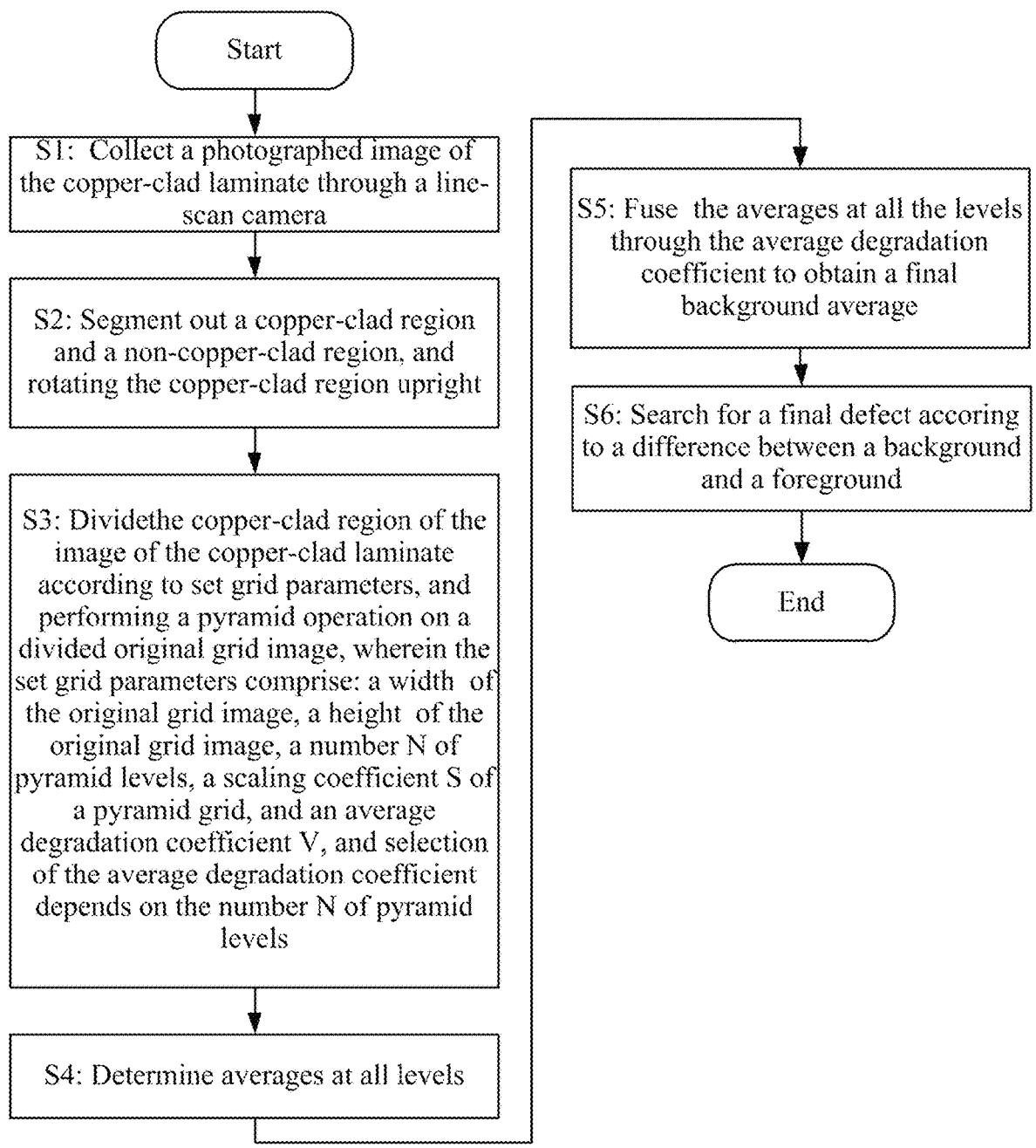
FIG. 1 is a flowchart of a detection method according to the present application.

Referring to FIG. 1, a method for detecting a surface defect of a copper-clad laminate based on multi-scale gridding in the present application is described in detail. During a production process, the copper-clad laminate is continuously transmitted through an assembly line. The method in the present application is used for performing online real-time detection on the defect of the copper-clad laminate.

In S1, images are acquired through a line scan camera. In this embodiment, four line-scan cameras are used to cover a photographed surface of the entire material. Each part of the material is photographed so that four clear images are acquired.

In S2, a copper-clad region and a non-copper-clad region are segmented out, and the copper-clad region is rotated upright.

Figure 2:
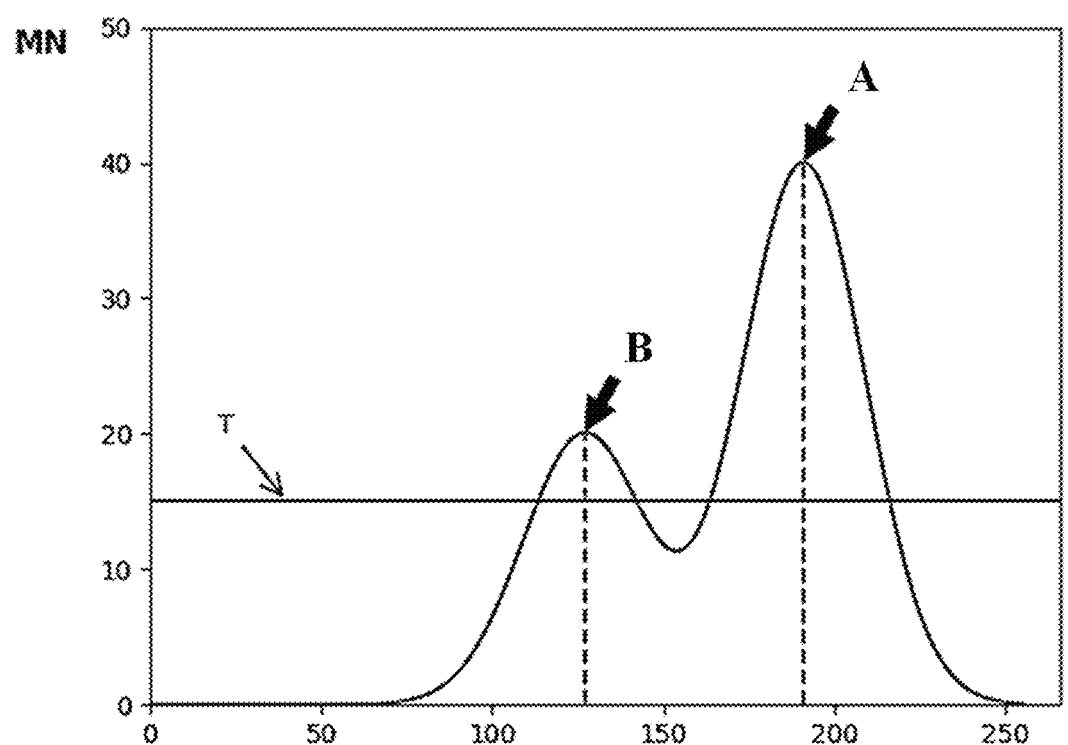
FIG. 2 is a histogram for segmenting an image of copper-clad laminate into a copper-clad region and a non-copper-clad region.

In S2.1, each image of the copper-clad laminate is segmented into the copper-clad region and the non-copper-clad region through threshold solution. The threshold solution is implemented through histogram-based background and foreground segmentation. According to the histogram segmentation algorithm, statistics on pixel values of the entire image from 0 to 255 are collected, and the pixel histogram of a background and the copper-clad region presents a bimodal phenomenon. As shown in FIG. 2, for the histogram, noise values are filtered through a fixed threshold T, and all pixel values less than T are suppressed. Then, the maximum value of the histogram is calculated twice such that positions representing the background and the copper-clad region are found. The average of the two is used as a final segmentation threshold for segmenting the copper-clad region from the background. A histogram solution formula is as follows:

$$p(r_i) = \frac{n_i}{MN}.$$

In the formula, $p(r_i)$ denotes the histogram, $n_i$ denotes the number of pixels with grayscales $r_i$, and MN denotes the number of all pixels. In FIG. 2, a horizontal coordinate denotes a pixel value, and a vertical coordinate denotes the number of pixels in an image with a current pixel value. Assuming that A is the peak of the background and B is the peak of the copper-clad region, the average t between the two is used as the final segmentation threshold, where t=(A+B)/2. Pixel values less than the threshold belong to the background, and pixel values greater than the threshold belong to the copper-clad region.

In S2.2, after the segmentation is completed, contours need to be extracted. In this case, the extracted contours may include the contour of the copper-clad region and the contour of a noise region. Since the copper-clad region is a large object in the image, the sizes of the contours are compared so that the copper-clad region is screened out. A formula is as follows: c_obj=max (c_obj,$c_m$), m∈(0,n);

where c_obj denotes an object contour, $c_m$ denotes a selected to-be-compared contour, m denotes a contour index, n denotes a total number of contours.

In S2.3, after the object contour is extracted, the actual orientation state of the copper-clad region needs to be determined, that is, it is determined that the object contour is an "upright" rectangle or a rectangle that is not "upright" and the position of the object contour in the image is determined. A target problem is able to be well solved through a minimum bounding rectangle algorithm. After the angle of the object contour and the central position of the object contour are obtained, the image of the copper-clad laminate by establishing an affine transformation matrix is rotated and translated to rotate the copper-clad region to an "upright" position. The copper-clad region is subsequently extracted from the image of the copper-clad laminate for subsequent visual defect detection. A formula for establishing the affine transformation matrix is as follows:

$$\begin{pmatrix} \cos\theta & -\sin\theta & tx \\ \sin\theta & \cos\theta & ty \\ 0 & 0 & 1 \end{pmatrix} \begin{pmatrix} x \\ y \\ 1 \end{pmatrix} = \begin{pmatrix} x' \\ y' \\ 1 \end{pmatrix};$$

where in the matrix, θ denotes the angle of the copper-clad region screened out, tx and ty denote relative amounts by which a center translation needs to be performed, x and y denote a transformed coordinate point, and x' and y' denote the coordinates of a rotated and translated point. After the preceding operations, the image of the copper-clad region is obtained.

In S3, the width Δx of an original grid image, the height Δy of the original grid image, the number N of pyramid levels, a pyramid scaling coefficient S, and an average degradation coefficient V are set. The selection of the average degradation coefficient depends on the number N of pyramid levels.

Figure 3A:
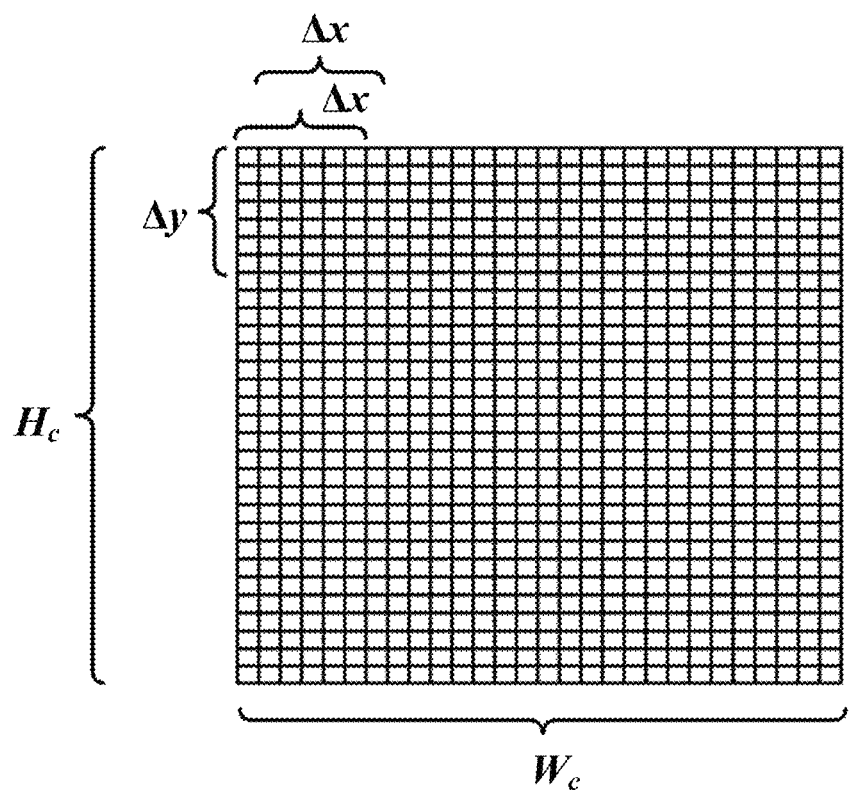
FIG. 3A is a diagram showing a step size of pixels.
Figure 3B:
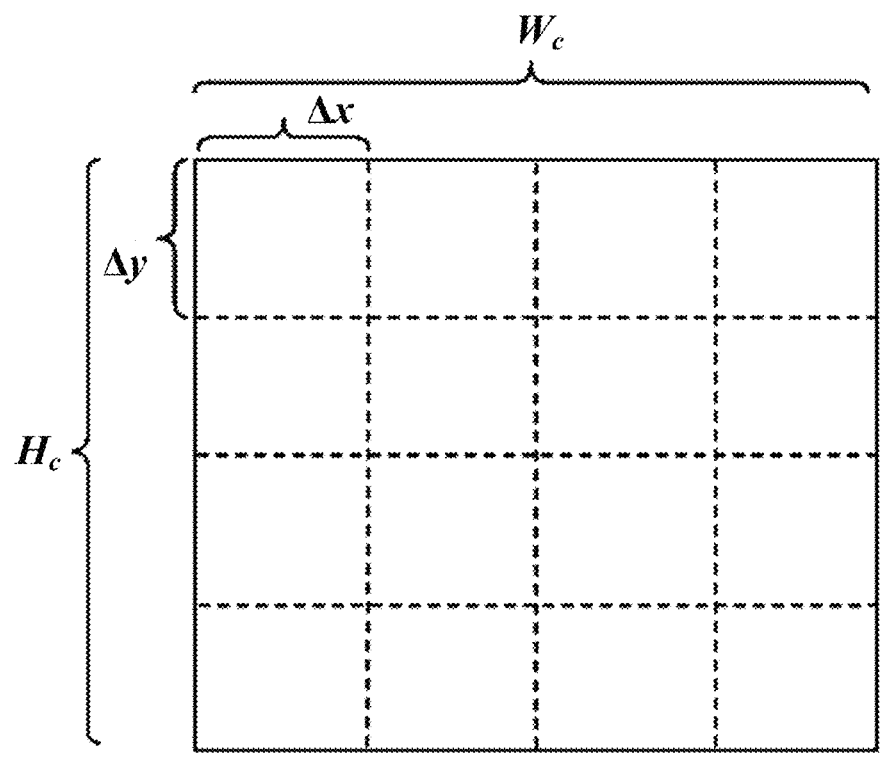
FIG. 3B shows the division of original grid images.

The width of the original grid image and the height of the original grid image are Δx and Δy, respectively. Δx<$W_c$&&Δy<$H_c$, where $W_c$ denotes the width of the copper-clad region, and He denotes the height of the copper-clad region. Thus, the entire copper-clad region is divided into multiple original grid images. During conventional background creation, image blocks need to be acquired pixel by pixel according to a sliding window, as shown in FIG. 3A. If the overall average of the image blocks is used as a background value in the related art, it is excessively time-consuming to obtain the background value and the background value is easily affected by the grayscales and sizes of internal defects. The method provided by the present application avoids the preceding problems.

The number N of pyramid levels is represented as a formula:

$$N = \begin{cases} N, & W >= 5 \ \&\& \ H >= 5; \\ 1, & \text{ELSE} \end{cases}.$$

The number of pyramid levels is set according to the width of the pyramid grid image and the height of the pyramid grid image. When the width of the pyramid grid image or the height of the pyramid grid image exceeds 5, the number of pyramid levels is forcibly set to 1, and a pyramid operation is stopped.

A pyramid coefficient is used for determining the width and height of a pyramid image at each level. That is, $W_N$=W*S,$H_N$=H*S, where $W_N$ denotes the width of the grid image subjected to the N-th level scaling, $H_N$ denotes the height of the pyramid grid image subjected to the N-th level scaling.

The calculation of the average degradation coefficient V depends on the number N of pyramid levels, and the average degradation coefficient V is the reciprocal 1/N of the number N of pyramid levels.

The copper-clad region is divided into the original grid images in the following manners: according to the set width and height of the original grid image, movement is performed each time using the width Δx of the original grid image as a step length along the direction of the X-axis in the copper-clad region, and movement is performed each time using the height Δy of the original grid image as a step length along the direction of the Y-axis in the copper-clad region such that the coordinates of four angular points of the pyramid grid image are acquired. In this manner, the copper-clad region is divided into K portions, that is, the K original gird images.

$$K = \text{ceil}\left(\frac{W_c}{\Delta X}\right) * \text{ceil}\left(\frac{H_c}{\Delta Y}\right);$$

where ceil denotes rounding up.

After the preceding operations are completed, the pyramid scaling operation is performed on each of the acquired original grid images. Each of the original grid images is scaled into N images, and a formula for calculating the width and height of each of the N images is as follows:

$$W_{i=0,1,2\ldots N} = W_0 * S*(i+1); \text{ and}$$

$$N_{i=0,1,2\ldots N} = H_0 * S*(i+1).$$

Figure 4:
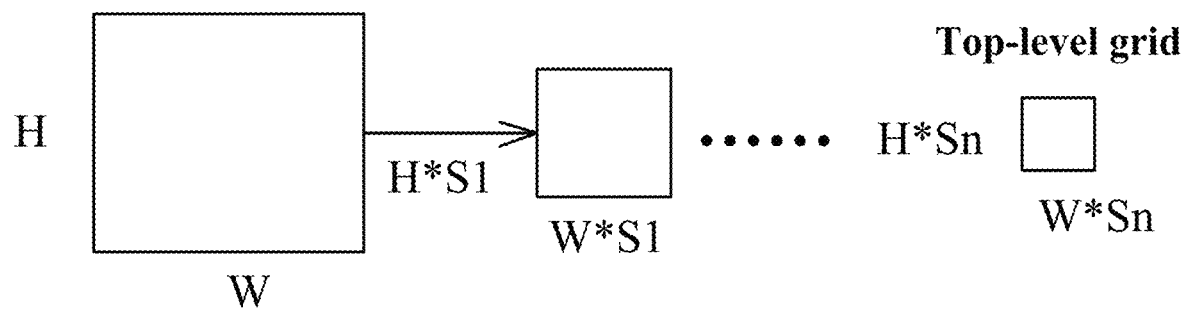
FIG. 4 is a diagram showing a process for creating pyramid grid images.

$W_0$ denotes the width of the original grid image, $H_0$ denotes the height of the original grid image. It is to be noted that when $W_j$ or $H_j$ is less than 5 pixel values, the pyramid operation is stopped. A series of pyramid grid images created from each of the original grid images are regarded as one group. That is, K groups of pyramid grid images are created from the K original grid images. K*N images are created in total. The process is shown in FIG. 4.

Figure 5:
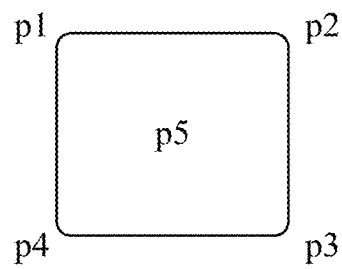
FIG. 5 is a schematic diagram of a 4-point interpolation and averaging algorithm.

In S4, the average of each of the K*N images created above is calculated. A 4-point interpolation and averaging algorithm based on gridding is adopted. One of the pyramid grid images is used as an example. As shown in FIG. 5, pixel grayscales of four vertices $p_1$, $p_2$, $p_3$, and $p_4$ are obtained. The grayscale of the central point $p_5$ of a grid is interpolated through bilinear interpolation and used as a background value of the current pyramid grid image.

An interpolation formula is as follows:

$$f_1 = \frac{p_2^x - \Delta x * 0.5}{p_2^x - p_1^x} f(p_1) + \frac{\Delta x * 0.5 - p_1^x}{p_2^x - p_1^x} f(p_2);$$

$$f_2 = \frac{p_4^x - \Delta x * 0.5}{p_4^x - p_3^x} f(p_3) + \frac{\Delta x * 0.5 - p_3^x}{p_4^x - p_3^x} f(p_4); \text{ and}$$

$$f(p_5) = f_1 * \frac{p_4^y - \Delta y * 0.5}{p_4^y - p_3^y} + f_2 * \frac{\Delta y * 0.5 - p_3^y}{p_4^y - p_3^y}.$$

In the preceding formulas, $f_i$ denotes pixel values of different vertices, $p_i^x$ and $p_i^y$ denote an x value and a y value of a vertex of the four vertices, respectively, and i=1, 2, 3, and 4.

Through the preceding calculations, all the original grid images and all the pyramid grid images each have a background value.

In S5, a background value of the original grid image and background values of the pyramid grid images are fused as a final background value of an original region. The background value of the original grid image and the background values of the pyramid grid images are selected, multiplied by the average degradation coefficient, and accumulated such that the final background value is obtained. A formula is as follows:

$$avg = \sum_{i=0,1\ldots N} a_i * V;$$

where avg denotes the final background value, $a_i$ denotes the average of each level, V denotes the average degradation coefficient.

Figure 6:
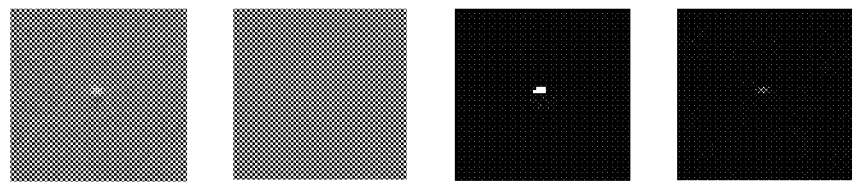
FIG. 6 shows an original image, a defect background image, a foreground candidate image, and a defect image in a defect detection process, respectively.

In S6, an empty image that is the same size as the original grid image is created. The entire empty image is filled with the value avg to form the defect background image. The image is differenced from the original grid image at a pixel level. In addition, a grayscale tolerance for black and white defects is set. Pixel blobs within the grayscale tolerance are regarded as a foreground candidate image. The detection effect is shown in FIG. 6. after the defect is detected, the defect needs to be classified.

Conventional classification is performed through manual extraction of features, for example, the aspect ratio, roundness, or concavity of a defect. These attributes are used as features to be inputted into a classifier for classification training. However, due to limitations of feature attributes, classification accuracy, robustness, and scalability are poor. Especially when new defects appear in an actual working condition, parameters cannot be adjusted well, resulting in that previously set classification conditions are broken. Considering the preceding problems and real-time problems during actual on-site detection, MobileNetV2, a model based on deep learning, is used as a transfer model in the present application. A fully connected layer is continuously connected based on an original network, and a classification layer is redesigned according to a defect category, as described below.

Figure 7:
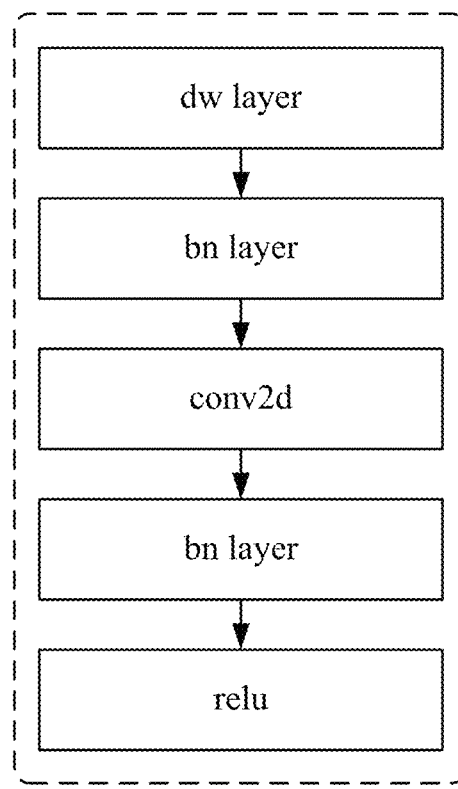
FIG. 7 is a composition diagram of a feature pyramid structure.
Figure 8:
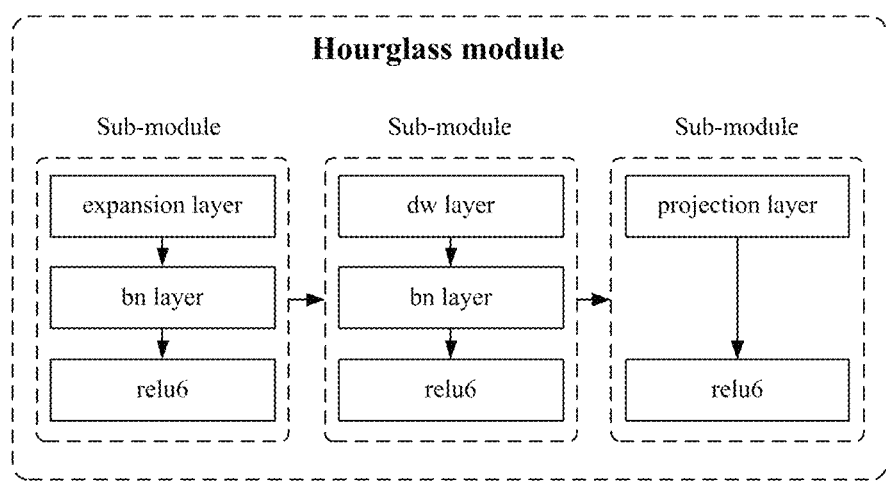
FIG. 8 is a composition diagram of modules of a hourglass structure.

A network transfer structure based on MobileNetV2 is constituted by an inverted residual structure, a feature pyramid structure (different from the pyramid mentioned above and shown in FIG. 7), a hourglass module (shown in FIG. 8), and a classification module.

The hourglass module is built based on three types of sub-modules. Each of the sub-modules is built by connecting different network layers, and the three types of sub-modules are listed as follows: a sub-module 1: a dimension expansion layer, a normalization layer, a relu6 activation function layer; a sub-module 2: a depthwise separable layer, a normalization layer, a relu6 activation function layer; and a sub-module 3: a dimension reduction layer, and a normalization layer.

A residual structure is configured to perform element-wise addition on an input feature of the hourglass structure and an output feature of the hourglass structure to fuse the features. A classification layer refers to two fully connected layers at the end of a network to perform flattening according to the defect category. Classifying the defect includes steps below.

In 6.1.1, an inputted image and one convolutional layer are connected in series to start feature extraction in the first layer.

In 6.1.2, the three sub-modules are formed into the hourglass structure, and different numbers of hourglass structures are connected in series to form the inverted residual structure to acquire features of different dimensions and avoid the excessive number of parameters.

In 6.1.3, a skip connection pyramid operation is performed at the end of the network so that feature information is abstracted and it is ensured that information loss does not occur due to excessive abstraction.

Figure 9:
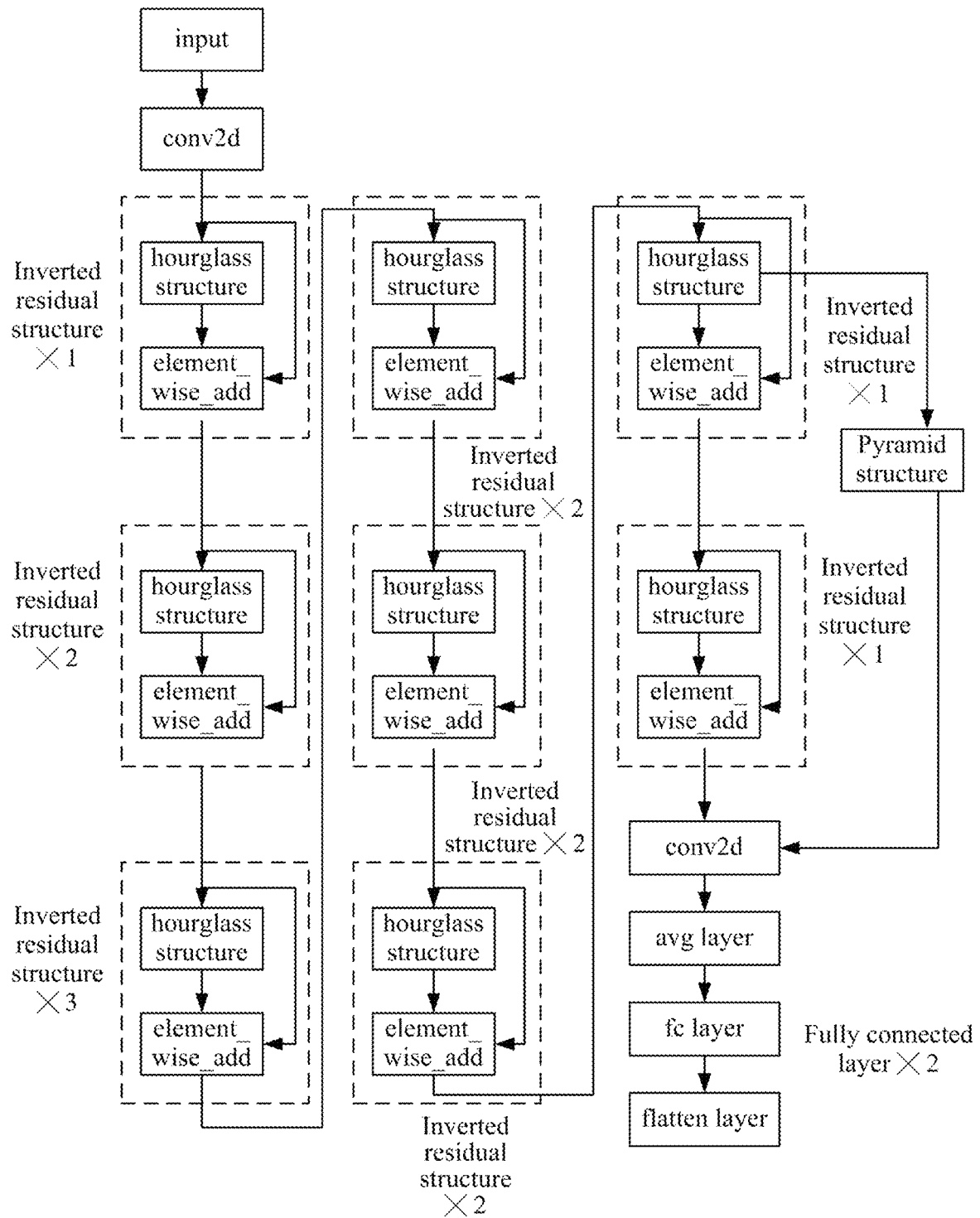
FIG. 9 is a composition diagram of modules of a transfer model.

The structure of the network is shown in FIG. 9. In FIG. 9, Conv2d refers to the convolutional layer, Element_wise_add refers to an element-wise addition layer, Avg_layer refers to a pooling layer, Fc layer refers to the fully connected layer, and Flatten layer refers to the classification layer.

In 6.2, defect sample data is collected and labeled with categories, and the pre-processed data is inputted to the network for training, where the network adjusts final output according to a set loss function.

The loss function used is defined as follows:

$$\text{loss}(x, cls) = -\log\left(\frac{\exp^{x[cls]}}{\sum_{n=1}^{C}\exp^{x[n]}}\right).$$

In the formula, x[cls] denotes a predicted value, cls denotes a true label category, C denotes a number of categories, n denotes an index of a category, and a smaller loss indicates a greater probability in a corresponding bracket and a greater probability that a sample is in a true category.

In 6.3, after the training is completed, a model is deployed in an actual running environment. When a defect is detected normally, the defect is inputted into the network to be classified. A final defect classification effect is achieved.

What is claimed is:

1. A method for detecting a surface defect of a copper-clad laminate based on multi-scale gridding, comprising:
   S1, collecting a photographed image of the copper-clad laminate through a line-scan camera;
   S2, segmenting out a copper-clad region and a non-copper-clad region, and rotating the copper-clad region upright;
   S3, dividing the copper-clad region of the image of the copper-clad laminate according to set grid parameters, and performing a pyramid operation on a divided original grid image, wherein the set grid parameters comprise: a width $\Delta x$ of the original grid image, a height $\Delta y$ of the original grid image, a number N of pyramid levels, a scaling coefficient $S_j$ of a pyramid grid at each level, wherein j denotes an index of a pyramid grid level, and an average degradation coefficient V, and selection of the average degradation coefficient depends on the number N of pyramid levels;
   S4, determining an average of the original grid image and averages of pyramid grid images at all levels;
   S5, fusing the average of the original grid image and the averages of pyramid grid images at all the levels through the average degradation coefficient to obtain a final background average; and
   S6, classifying a defect;
   wherein $\Delta x$ is used as the width of the original grid image and $\Delta y$ is used as the height of the original grid image such that the copper-clad region is divided into K original grid images, and the pyramid operation is performed on each of the K original grid images; the number N of pyramid levels is represented as a formula:

$$N = \begin{cases} j+1, & W_j >= 5 \;\&\&\; H_j >= 5 \\ 1, & \text{ELSE} \end{cases},$$

wherein $W_j$ denotes a width of a pyramid grid image at each level, $H_j$ denotes a height of the pyramid grid image at each level, the number of pyramid levels is set according to the width of the pyramid grid image and the height of the pyramid grid image, in response to the width of the pyramid grid image or the height of the pyramid grid image exceeding 5, the number of pyramid levels is forcibly set to 1, and the pyramid operation is stopped, otherwise, the original grid image is scaled to N levels with the scaling coefficient $S_j$, wherein $S_j$ is a coefficient greater than 0 and less than 1, and j denotes the index of the pyramid grid level; and a calculation of the average degradation coefficient V depends on the number N of pyramid levels, and the average degradation coefficient V is a reciprocal 1/N of the number N of pyramid levels.

2. The method for detecting a surface defect of a copper-clad laminate based on multi-scale gridding according to claim 1, wherein step S2 comprises:
   S2.1, segmenting each image of the copper-clad laminate into the copper-clad region and the non-copper-clad region through threshold solution, wherein the threshold solution is implemented through histogram-based background and foreground segmentation;
   S2.2, after the background and foreground segmentation is completed, comparing sizes of contours to screen out the copper-clad region by the following formula:

c_obj=max (c_obj,$c_m$),m $\in$(0,n);

wherein c_obj denotes an object contour, $c_m$ denotes a selected to-be-compared contour, m denotes a contour index, n denotes a total number of contours, and max denotes selection of a maximum contour; and
   S2.3, after the object contour is extracted, determining an actual orientation state of the copper-clad region through a minimum bounding rectangle algorithm, that is, determining that the object contour is an "upright" rectangle or a rectangle that is not "upright" and a position of the object contour in the image of the copper-clad laminate, and after an angle of the object contour and a central position of the object contour are obtained, rotating and translating the image of the copper-clad laminate by establishing an affine transformation matrix to rotate the copper-clad region to an "upright" position, wherein the copper-clad region is subsequently extracted from the image of the copper-clad laminate for subsequent visual defect detection.

3. The method for detecting a surface defect of a copper-clad laminate based on multi-scale gridding according to claim 1, wherein in step S4, a 4-point interpolation and averaging algorithm is performed on each of K*N images by the following formulas:

$$f_1 = \frac{p_2^x - \Delta x * 0.5}{p_2^x - p_1^x} f(p_1) + \frac{\Delta x * 0.5 - p_1^x}{p_2^x - p_1^x} f(p_2);$$

$$f_2 = \frac{p_4^x - \Delta x * 0.5}{p_4^x - p_3^x} f(p_3) + \frac{\Delta x * 0.5 - p_3^x}{p_4^x - p_3^x} f(p_4); \text{ and}$$

$$f(p_5) = f_1 * \frac{p_4^y - \Delta y * 0.5}{p_4^y - p_3^y} + f_2 * \frac{\Delta y * 0.5 - p_3^y}{p_4^y - p_3^y};$$

wherein $p_1$, $p_2$, $p_3$, and $p_4$ denote four vertices of the pyramid grid image, $f_i$ denotes pixel values of different vertices, $p_i^x$ and $p_i^y$ denote an x value and a y value of a vertex of the four vertices, respectively, and i=1, 2, 3, and 4 in the preceding formulas, K denotes the number of original grid images, and N denotes the number of pyramid levels; and through the preceding calculations, all the original grid images and all pyramid grid images each have a background value.

4. The method for detecting a surface defect of a copper-clad laminate based on multi-scale gridding according to claim 1, wherein in step S5, all background values are combined as a final background value of an original region, background values of pyramid grid images are selected, multiplied by the average degradation coefficient, and accumulated such that the final background value is obtained, and a formula is as follows:

$$avg = \sum_{j=0,1...N} a_i * V \left[\left[ avg = \sum_{j=0,1...N} a_j * V \right]\right];$$

wherein avg denotes the final background value, $a_j$ denotes an average of pixel values of each level, V denotes the average degradation coefficient, and j denotes the index of the pyramid grid level in the preceding formula; and an empty image that is a same size as the original grid image is created, the entire empty image is filled with the value avg to form a defect background image, the defect background image is differenced from the original grid image, a grayscale tolerance for black and white defects is set, and a defect is detected.

5. The method for detecting a surface defect of a copper-clad laminate based on multi-scale gridding according to claim 4, wherein step S6 comprises:

6.1.1, connecting an inputted image and one convolutional layer in series to start feature extraction in a first layer;

6.1.2, forming the three sub-modules into the hourglass structure, and connecting different numbers of hourglass structures in series to form the inverted residual structure to acquire features of different dimensions and avoid an excessive number of parameters; and 6.1.3, performing a skip connection pyramid operation at the end of the network so that feature information is abstracted and it is ensured that information loss does not occur due to excessive abstraction;

6.2, collecting defect sample data, labeling the defect sample data with categories, and inputting the pre-processed data to the network for training, wherein the network adjusts final output according to a set loss function; and the loss function used is as follows:

$$loss(x, cls) = -\log\left(\frac{\exp^{x[cls]}}{\sum_{n=1}^{C}\exp^{x[n]}}\right);$$

wherein x[cls] denotes a predicted value, cls denotes a true label category, C denotes a number of categories, n denotes an index of a category, and a smaller loss indicates a greater probability in a corresponding bracket and a greater probability that a sample is in a true category; and 6.3, after the training is completed, deploying a model in an actual running environment, wherein when a defect is detected normally, the defect is inputted into the network to be classified to achieve a final defect classification result.

6. The method for detecting a surface defect of a copper-clad laminate based on multi-scale gridding according to claim 1, wherein MobileNetV2, a model based on deep learning, is used as a transfer model; and a network transfer structure of the transfer model comprises an inverted residual structure, a pyramid structure, a hourglass module, and a classification module;

wherein the hourglass module is built based on three types of sub-modules, each of the sub-modules is built by connecting different network layers, and the three types of sub-modules are listed as follows:

a sub-module 1: a dimension expansion layer, a normalization layer, and a relu6 activation function layer;

a sub-module 2: a depthwise separable layer, a normalization layer, and a relu6 activation function layer; and a sub-module 3: a dimension reduction layer, and a normalization layer; and a residual structure is configured to perform element-wise addition on an input feature of the hourglass structure and an output feature of the hourglass structure to fuse the features, and a classification layer refers to two fully connected layers at an end of a network to performs flattening according to a defect category.

* * * * *